United States Patent [19]

Maemori

[11] Patent Number: 4,837,817

[45] Date of Patent: Jun. 6, 1989

[54] VIDEO CAMERA WITH REMOVABLE VIEWER AND CONTROLS

[75] Inventor: Takashi Maemori, Tokyo, Japan

[73] Assignee: Fuji Photo Film Co., Ltd., Kanagawa, Japan

[21] Appl. No.: 39,848

[22] Filed: Apr. 20, 1987

[30] Foreign Application Priority Data

Apr. 18, 1986 [JP] Japan .............................. 61-57589[U]

[51] Int. Cl.$^4$ ............................................ G03B 13/10
[52] U.S. Cl. .............................. 358/224; 358/213.13; 358/229
[58] Field of Search ................... 358/213.13, 224, 909, 358/229

[56] References Cited

U.S. PATENT DOCUMENTS

| 4,420,773 | 12/1983 | Toyoda et al. | 358/335 |
| 4,672,436 | 6/1987 | Hawthorne | 358/93 |
| 4,682,240 | 7/1987 | Bachman | 358/224 |
| 4,692,006 | 9/1987 | Rice et al. | 354/75 |

FOREIGN PATENT DOCUMENTS 166782 10/1982 Japan .
195370 11/1983 Japan .

Primary Examiner—Robert Lev
Attorney, Agent, or Firm—Sughrue, Mion, Zinn, Macpeak & Seas

[57] ABSTRACT

A video camera having an attachable and removable section including an LCD view finder and controls for the camera.

3 Claims, 2 Drawing Sheets

VIDEO CAMERA WITH REMOVABLE VIEWER AND CONTROLS

BACKGROUND OF THE INVENTION

1. Field of the Invention

This invention relates generally to a video camera which can be remotely controlled, and more particularly to a video camera having a remote control unit with a view finder.

2. Background of the Invention

Recently, the percentage of people who own a video camera has remarkably increased. A video camera which is integral with a VTR (video tape recorder) (hereinafter referred to merely as "a video camera") has been widely available on the market.

In the conventional video camera, the view finder is integral with the camera body. Therefore, the photographer (or operator) can photograph objects while observing their images, or observe the reproduced images.

In addition, a video camera is well known in the art which is so designed that, in order to increase the range of application, it has a remote control function so that it can be remotely operated.

However, a video camera has not been proposed in the art in which a view finder is installed on its remote control unit, because it is impossible to make the remote control unit with the view finder into a compact unit.

However, in order to avoid photographic failures during the remote control operation of the video camera, it is necessary to confirm whether or not the image of the object is acceptable.

SUMMARY OF THE INVENTION

In view of the foregoing, an object of this invention is to provide a video camera having a remote control unit with a view finder which is compact and has excellent operating characteristics.

The foregoing object of the invention has been achieved by a video camera which can be remotely controlled in which, according to the invention, a remote-control-operation control section including a view finder function display section is detachably mounted as one integral remote control unit on the body of the camera.

DETAILED DESCRIPTION OF THE PREFERRED EMBODIMENTS

One embodiment of this invention will be described with reference to the accompanying drawings in detail.

Figure 1:
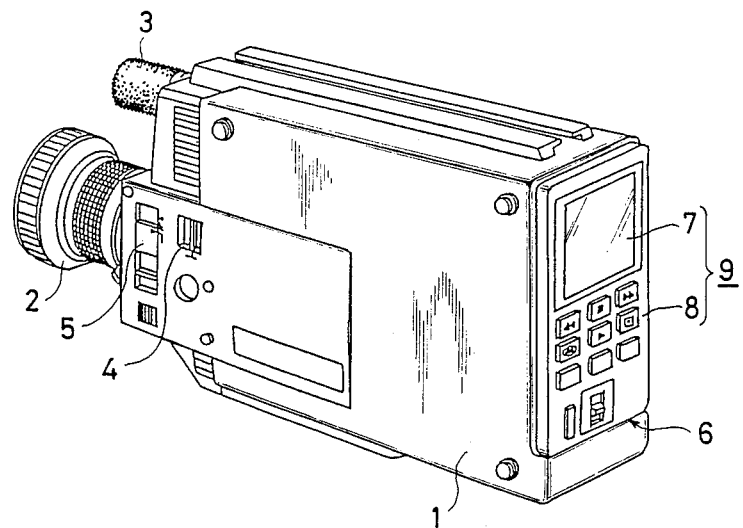
FIG. 1 is a perspective view showing a video camera which is one embodiment of this invention.
Figure 2:
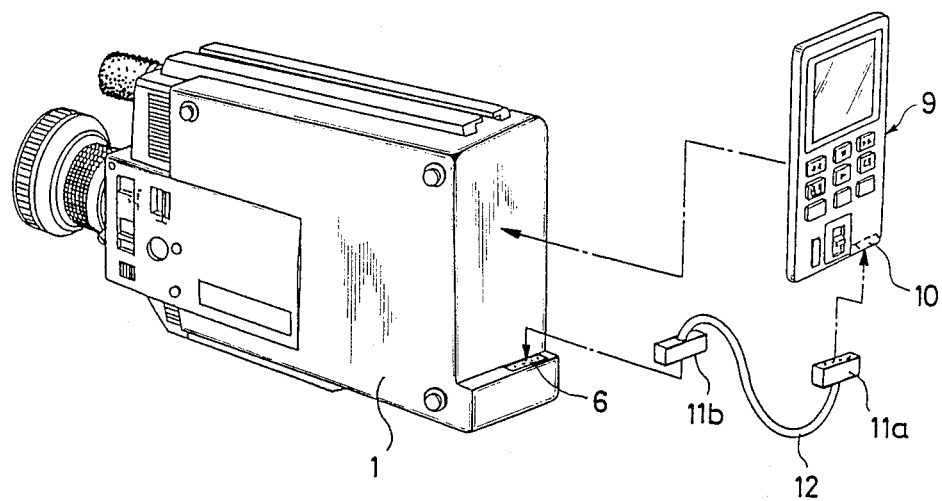
FIG. 2 is an explanatory diagram showing the control unit.

FIGS. 1 and 2 show an embodiment of the invention, namely, a video camera. The video camera is made up of components which are substantially the same as those of a conventional video camera. That is, a photographic lens 2 and a microphone 3 are attached to the front end of the camera body 1, and a camera power switch 4 and a white balance switch 5 are secured to one side of the camera body 1. As shown in FIG. 2, a remote control terminal unit 6 is provided at the lower portion of the rear end of the camera body 1 as shown in FIG. 2. Furthermore, a control section 9 comprising a view finder function display section 7 (hereinafter referred to merely as "a view finder") and a plurality of switches 8 are arranged on the rear end of the camera body as shown in FIG. 1.

More specifically, the control section 9 is detachably mounted on the rear end of the camera body 1 as shown in FIG. 1, thus forming a part of the camera body 1. When, as shown in FIG. 2, the control unit 9 is removed from the camera body 1 and a viewer terminal unit 10 provided at the lower end of the control section 9 is connected to the remote control terminal unit 6 of the camera body 1 with a cable 12 having connectors 11a and 11b at both ends, the control unit 9 serves as a remote control unit.

The switches 8 of the control section 9 are used to operate the camera section and the deck section of the video camera. More specifically, the switches 8 are operated for the zooming, exposure adjustment of the camera section, and the start/stop, rewinding, fast forwarding, reproducing and temporary stop operations of the deck section.

The video camera of the invention will be described with reference to FIG. 3. This figure is a block diagram showing its circuitry in more detail.

In the video camera of the invention, the view finder 7 employs a conventional liquid crystal television system.

Figure 3:
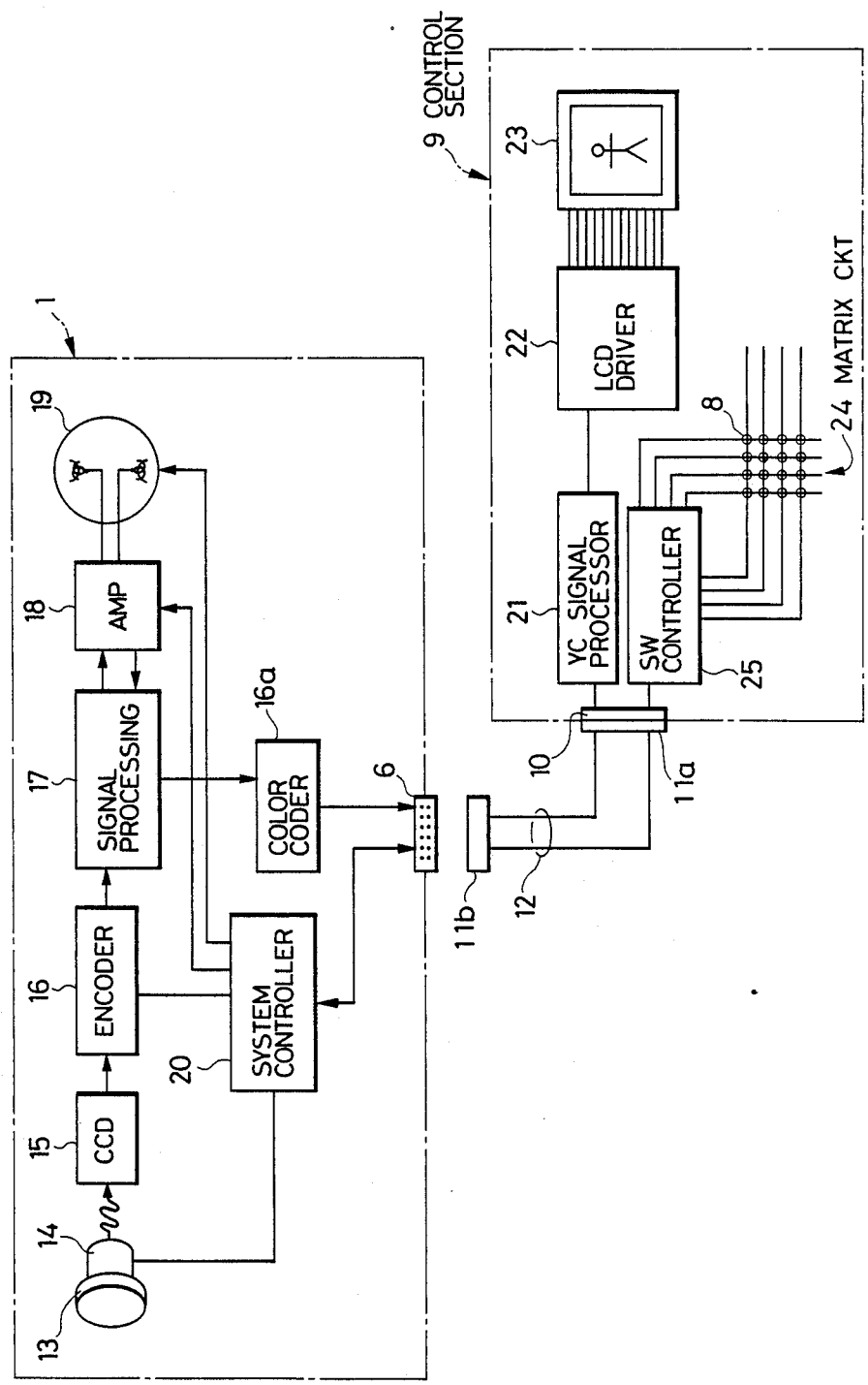
FIG. 3 is a block diagram of the circuitry of the video camera according to the invention.

In FIG. 3, an object is photographed through a zoom lens 13 by a solid image-pickup element (CCD) 15. The zoom lens 13 is caused to zoom in and out by a drive system 14 which is controlled by a system controller 20.

The above-described solid image-pickup element 15 subjects the image of the object to photoelectric conversion to provide color signals (for instance red, green and blue). The color signals are applied to a matrix circuit (not shown) to provide color difference signals and luminance signals. The output of the matrix circuit is supplied to an encoder 16, which outputs a video signal. For the purpose of recording and reproduction, the video signal thus outputted is converted into a recording signal by a signal processing section 17 according to a suitable modulation system such as an FM modulation system. The recording signal is supplied through a recording and reproducing amplifier 18 to a magnetic head 19, which records it on a magnetic recording medium such as a video tape.

The video signal recorded on the video tape is reproduced by the following method. The reproducing signal read by the magnetic head 19 is amplified by the recording and reproducing amplifier 18 and demodulated by the signal processing section 17. The demodulated signal is converted into the original color difference signals and luminance signals by a color coder 16a. These signals are applied to the previously mentioned remote controller terminal unit 6.

The system control 20 separately switches the operations of the recording and reproducing amplifier 18 and of the recording and reproducing magnetic head 19 according to the recording operation and the reproducing operation and produces a synchronizing signal for synchronization of the signal for the recording operation and those for the reproducing operation.

When the control section 9 is used as the remote control unit, it is connected to the remote control terminal unit 6 through the cable 12 as was described before. Therefore, the inputted color difference signals and luminance signals are converted into a video signal for display by the liquid crystal television by a signal processing section 21. The image of the object is displayed on a liquid crystal television unit 23 with the aid of a liquid crystal television unit drive circuit 22.

The plurality of switches 8 of the control section 9 form a matrix circuit 24 and are controlled by a switch controller 25. The aforementioned system controller 20 is controlled by depression of the switches 8.

The details of switches which have been depressed are displayed on a display means (not shown) through feedback of the system controller 20 which. is provided on the control section 9.

In the above-described embodiment of the invention, the control section 9 can be disconnected from the camera body 1, to serve as the remote control unit. However, the control section 9 may be so modified that it is not removable from the camera body 1 but performs the same functions. In this modification, the control section 9 acts as one of the video camera components.

According to the video camera of the present invention, the remote control unit includes the view finder display unit and the switch from zooming operation while photographing and/or the switch for exposure adjustment, so that it is possible to photograph images of objects after the picture structure of the objects is most suitably selected on the view finder display unit also, it the operator notices that the main object is remarkably dark through the view finder display unit, it is possible to control the exposure condition for the control section so that the brightness of the main object is increased and the exposure condition is adjusted appropriately. As described above, one can photograph objects while observing their images even during remote control operation, so that failures in recording the images of the objects can be avoided.

Especially when the photographer (or operator) photographs (or records) the image of himself with the video camera of the invention, he can confirm the image on the view finder, and therefore he can successfully record the image.

Since the view finder employs the liquid crystal television unit, the remote control of the video camera can be achieved satisfactorily with the view finder at all times, and the video camera itself can be made compact. Furthermore, as the control section is detachably mounted on the camera body so that it is used as the remote control unit when necessary, for instance it is unnecessary for the user to separately purchase the remote control unit, and the operating system of the video camera is improved as much.

What is claimed is:

1. A video camera, comprising:
   a camera body with an electronic video camera section; and
   an auxiliary body detachably mounted on said camera body and including a control section for said video camera, said control section including a view finder display unit for said electronic video camera section and switches for controlling start/stop operation of said video camera when said auxiliary body is connected to said camera body directly through a cable.
   the improvement wherein said control section further comprises means for zooming operation and means for photographing exposure adjustment.

2. A video camera as recited in claim 1, wherein said view finder display unit includes a liquid crystal television screen.

3. A video camera as recited in claim 1, wherein said camera body includes a first signal terminal and said auxiliary body includes a second signal terminal detachably connectable to said first terminal and further comprising a cable detachably connectable at opposite ends to said first and second terminals for conveying signals therebetween.

* * * * *